United States Patent [19]

Greenblatt

[11] Patent Number: 5,136,586
[45] Date of Patent: Aug. 4, 1992

[54] METHOD AND APPARATUS FOR TELEPHONE LINE MULTIPLEX CHANNELING OF TOLL-QUALITY VOICE AND DIGITAL INFORMATION

[75] Inventor: Richard D. Greenblatt, Cambridge, Mass.

[73] Assignee: Academy of Applied Science, Concord, N.H. ; a part interest

[21] Appl. No.: 444,836

[22] Filed: Dec. 4, 1989

[51] Int. Cl.$^5$ .............................................. H04J 3/12
[52] U.S. Cl. ................... 370/110.4; 370/110.1; 370/111; 370/118; 379/88; 379/93; 381/29
[58] Field of Search ............ 370/110.4, 111, 77, 370/29, 37, 76, 110.1, 118, 109, 125, 24, 32, 70; 381/29, 31, 34; 379/67, 68, 87, 88, 93; 358/133, 138, 141–143, 145, 146, 425, 426

[56] References Cited

U.S. PATENT DOCUMENTS

| | | | |
|---|---|---|---|
| 4,377,860 | 3/1983 | Godbole | 370/111 |
| 4,394,760 | 7/1983 | Kammerlander | 370/111 |
| 4,425,661 | 1/1984 | Moses et al. | 370/110.4 |
| 4,479,213 | 10/1984 | Galand et al. | 370/118 |
| 4,519,073 | 5/1985 | Bertocci et al. | 370/110.1 |
| 4,670,874 | 6/1987 | Sato et al. | 370/110.1 |
| 4,697,264 | 9/1987 | Galensky et al. | 370/111 |
| 4,750,173 | 6/1988 | Blüthgen | 370/111 |
| 4,752,940 | 6/1988 | Graham | 370/111 |
| 4,813,040 | 3/1989 | Futato | 370/110.1 |
| 4,930,126 | 5/1990 | Kazecki et al. | 370/77 |

OTHER PUBLICATIONS

Jim Aikin, "Tangled Thread," *Keyboard Magazine*, Mar. 1989.

Primary Examiner—Douglas W. Olms
Assistant Examiner—Alpus H. Hsu
Attorney, Agent, or Firm—Rines and Rines

[57] ABSTRACT

A method and apparatus for telephone line multiplex channeling of toll-quality voice and modem-encoded digital data from telecommunication devices (FAX, computers, displays, printers, etc.) involving variably sample-compression of digitally converted voice signals within successive time frames, and filling the resulting unoccupied time within each such frame with the modem-encoded digital data, and preferably with guard band signals separating the voice and modem-encoded digital data within each frame.

16 Claims, 3 Drawing Sheets

METHOD AND APPARATUS FOR TELEPHONE LINE MULTIPLEX CHANNELING OF TOLL-QUALITY VOICE AND DIGITAL INFORMATION

The present invention relates to techniques for exchanging along public-switched conventional telephone lines and networks audio (voice) communication and digital information from modem-encoded auxiliary telecommunications devices (FAX, computer, printer, display, message storage, etc.), being more particularly directed to the use by appropriately-equipped telephones for "simultaneous" exchange of digital information from such devices while maintaining toll-quality voice communication and preferably with transparency to the user other than a special recognition signal identifying each party to the telephone connection as equipped for this function, as described in my copending U.S. patent application Ser. No. 369,704, filed Jun. 21, 1989, for Method of and Apparatus for Integrated Voice (Audio) Communication Simultaneously with "Under Voice" User-Transparent Digital Data Between Telephone Instruments.

BACKGROUND OF INVENTION

More specifically, the invention herein is directed to improved methods of and apparatus for enabling such simultaneity, on the same telephone conventional public line, of the exchange of such digital and voice communication—termed "data-under-voice" communication in said co-pending application, where this term is used in a generic sense not limiting the word "under" to be restricted to lower frequency bands, but broadly meaning transmitting the data with the voice by whatever technique. This is as contrasted with prior art use of public telephone lines either for voice or for digital information as described in said copending application. The problem is to enable, within such channel provided by the public switched telephone network, a full multiplex channel for exchange of digital information while simultaneously maintaining a toll-quality audio channel, as little degraded as possible from that provided by the entire original channel. The basic technique employed in accordance with the invention to achieve such "data-under-voice" communication is time compression of the analog voice signal, alternating this compressed signal with a signal encoding the information to be transmitted in the digital channel.

OBJECTS OF INVENTION

The principal object of the invention, therefore, is to provide a new and improved method of and apparatus for telephone-line multiplex channeling of toll-quality voice and digital information for the above-described "data-under-voice" communication and other purposes.

A further object is to provide a more generally useful improved technique and apparatus of this character, and which avoids the necessity for frequency band filters and the like.

Other and further objects will be explained hereinafter and are more particularly pointed out in the appended claims.

SUMMARY

In summary, however, from one of its broader aspects, the invention embraces a method of multiplexing audio (voice) signals and digital data which might be conventionally modem-encoded in prior systems as from telecommunications devices to achieve "data-under-voice" communication while retaining toll-quality voice, that comprises, converting the audio signals into digital form and sampling the same at a predetermined rate within a selected time frame of a plurality of successive equal time frames; playing back the sampled digitized audio signals during the next successive time frame in a shorter time than the sampling during the preceding time frame by increasing the rate of sampling per unit time, thereby leaving an unoccupied time interval for the remainder of that time frame; and inserting said digital data into said unoccupied time interval. Preferred and best mode details will hereinafter be presented.

DRAWINGS

The invention will now be described with reference to the accompanying drawings, FIG. 1 of which is a timing diagram of the methodology underlying the invention in preferred form showing the multiplexed signals with guard bands; and FIGS. 2 and 3 are block circuit diagrams of multiplexing encoding and decoding implementation, respectively;

DESCRIPTION OF PREFERRED EMBODIMENTS

Figure 1:
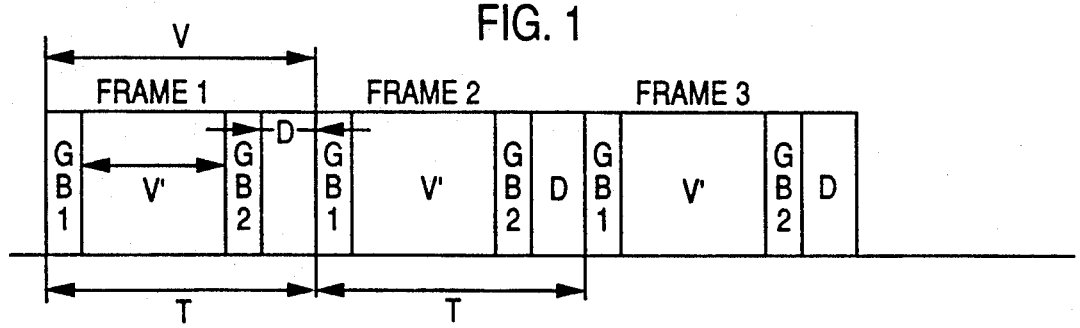

Referring to FIG. 1, the method underlying the invention operates by dividing time into a plurality of successive intervals or frames of standardized time duration T, with each frame containing a burst of each type of data —alternatively voice (compressed as hereinafter described) in FIG. 2—VOICE INPUT FROM MICROPHONE, ETC. and modem-encoded digital data segments from the appropriate telecommunication device(s) at each telephone, so-labelled in FIG. 2. Frames (1,2,3, etc.) occur at such standardized rate, preferably in the range of 4 to 10 per second (i.e. T=0.1 to 0.25 seconds).

Figure 2:
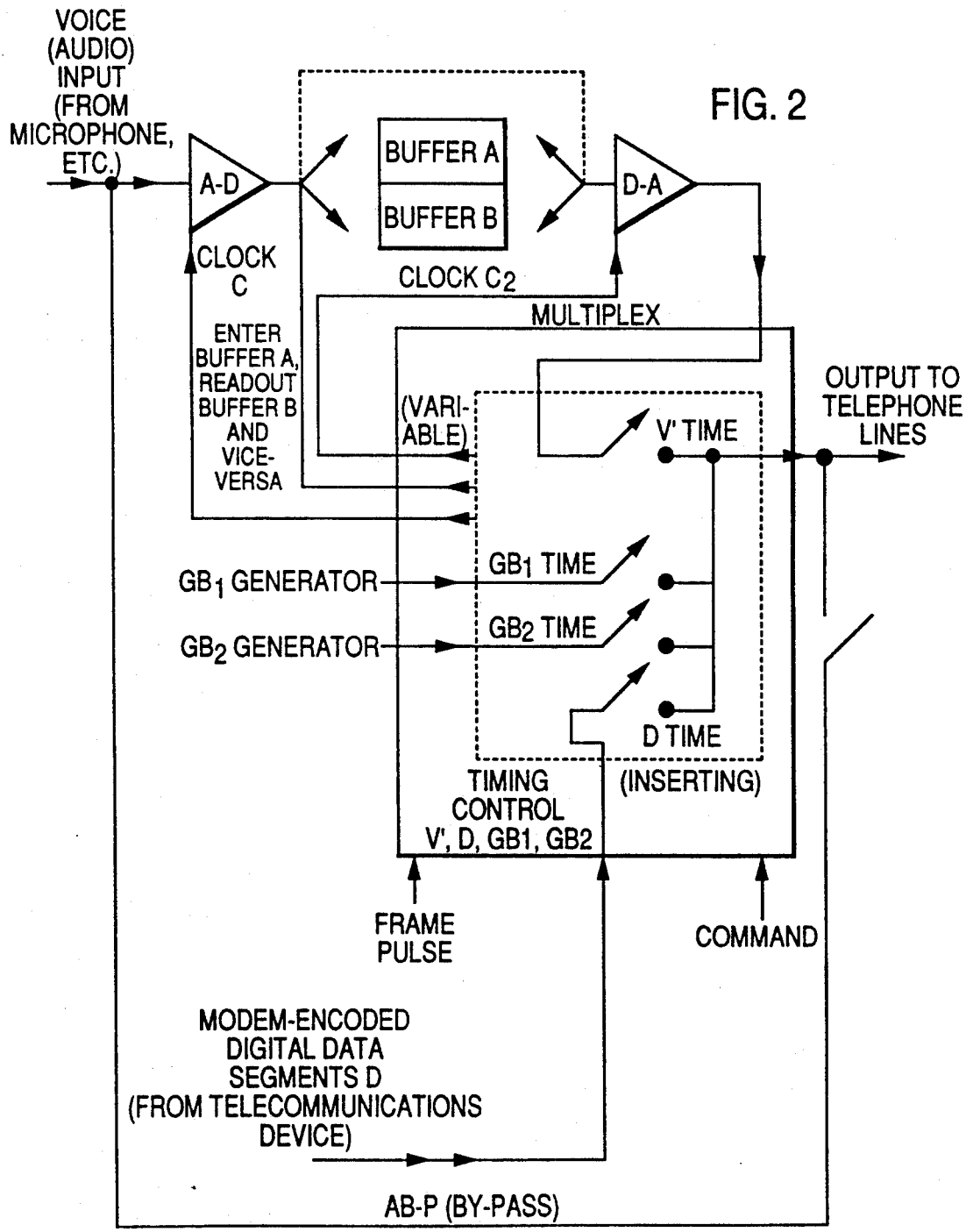

At each commutation of switching of this multiplexing of the channel (twice per frame), represented at MULTIPLEX in FIG. 2, it is preferred that guard bands $G\ B_1-G\ B_2$ are provided to minimize crosstalk between the two modes, as indicated at the MULTIPLEX control input. In "Frame 1", for example, the inputted analog audio (voice) signal VOICE INPUT, converted by the analog-to-digital converter A-D of FIG. 2 to digital form, is clocked or sampled, say at 8 KHZ as in conventional practice. This equates to a rate of 800 times during a frame time interval T=0.1 second. During the first portion of "Frame 2", this digitized audio voice signal consisting of the 800 sample recorded during "Frame 1", is played back at V' at a somewhat higher rate than the 8 KHZ sampling rate, as measured in samples per second, so that the playback is completed before the end of "Frame 2". This leaves an unoccupied remainder in which to multiplex-feed or insert a segment of the telecommunication device digital signal D encoded, as is well-known, in similar fashion to standard modem techniques, labelled MODEM-ENCODED DIGITAL DATA SEGMENTS D in FIG. 2, And as more particularly designated in FIG. 2 by the schematic switch $D_{time}$ controlled by the TIMING CONTROL of the MULTIPLEX, so-labelled. Thus, the voice communication samples recorded during period V are replayed at a faster rate during period V', providing the interval D into which the digital data channel information is inserted.

This encoding is shown effected in FIG. 2 through use of a pair of buffer memory devices A and B controlled by appropriate software to alternate the buffers at each frame interval, clock C acting on analog-to-digital converter A-D to digitally sample the voice input, and faster rate clock $C_2$ controlling digital-to-analog converter D-A that restores and plays back the analog voice V' at the output. While entering data in buffer A, buffer B is read out, as indicated by the legend in FIG. 2, and vice versa in this local instrument voice channel multiplexing apparatus of the encoding side.

Figure 3:
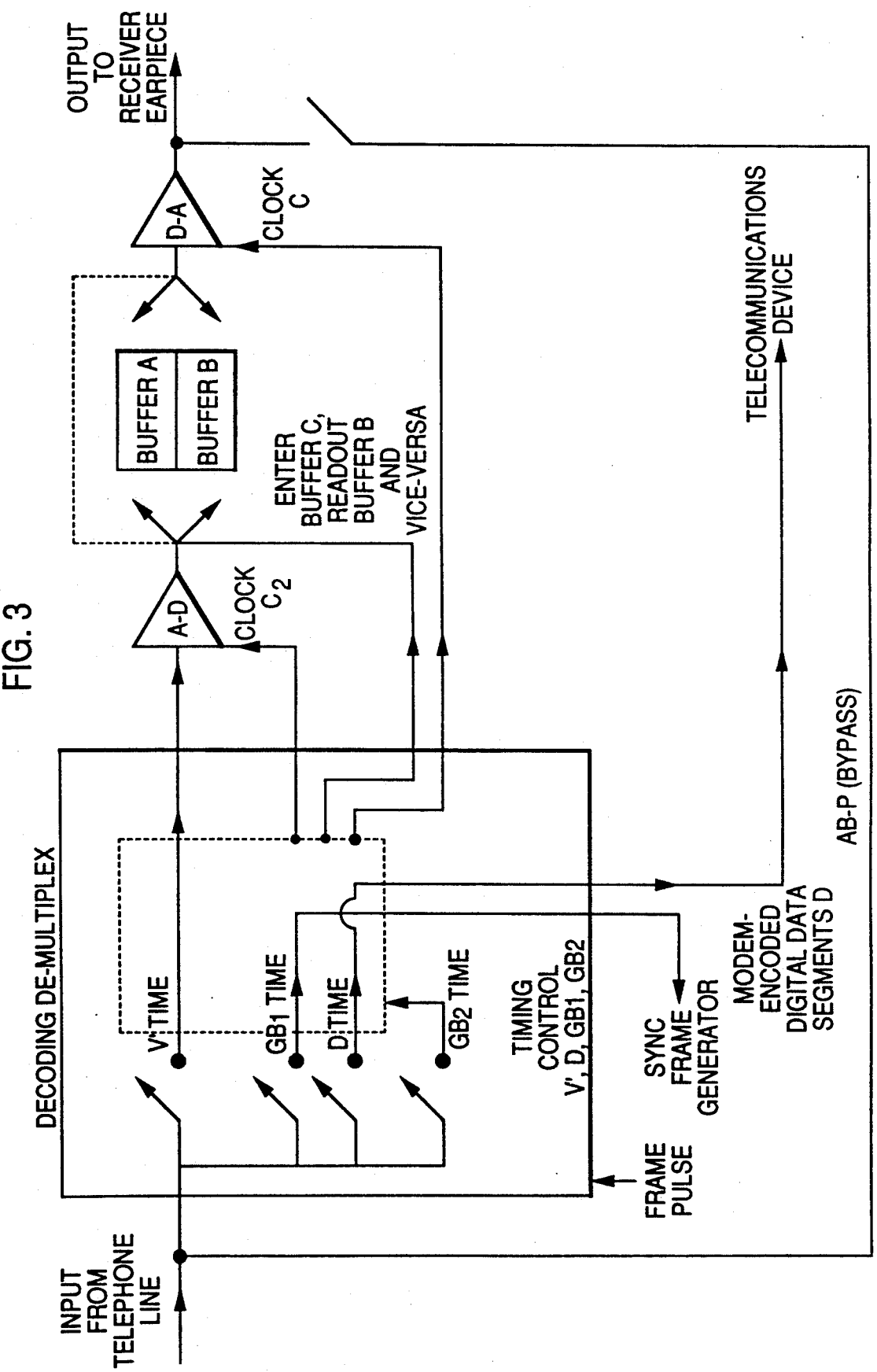

At the distant telephone station, the expansion portion of the receiving equipment is configured as in FIG. 3. The input from the telephone line is de-multiplexed (so-labelled in FIG. 3), and the audio portion is sampled by the A-D converter operating at the increased clock rate $C_2$. The readout, to the earphone, occurs using clock rate C at the digital-to-analog converter D-A. As before, buffer C is read while buffer D is filled, as labelled in FIG. 3 and vice-versa in the distant instrument voice channel decoding side. The modem-encoded digital data segments D are fed to the distant instrument telecommunications advice.

Figure 5:
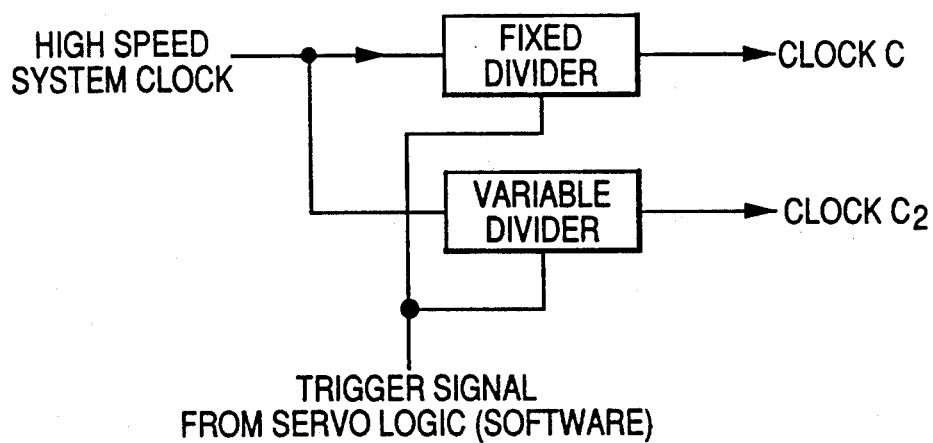
FIG. 5 is a block circuit diagram of clock generation for the apparatus of FIGS. 2 and 3.

It should be noted that the buffers A and B of FIG. 2 and C and D of FIG. 3 are each capable of holding samples for frame time T. For T=0.1 second and a clock rate C of 8 KHZ, this means 800 samples. As described, clock $C_2$ is faster than C, with the exact amount variable (indicated at "variable" in FIG. 2), depending on the desired digital channel rate. In FIG. 5, a suitable clock generation circuit is shown for deriving a variable faster clock rate at $C_2$ under the control of servologic software.

By playing the audio signal V' back faster than it has been sampled in the preceding frame, all frequency components are shifted upwards proportionally. Since the channel has a cut-off above a certain frequency, some high frequencies will be shifted out of the passband of the channel and lost. However, most actual channels have a higher passband than that necessary for "toll-quality" transmission. The shifting technique utilizes whatever excess bandwidth may be available to maximum advantage. Furthermore, because speed requirements of the digital channel are frequently modest, only a slight shift of the audio channel is required. For example, if a 300 baud digital data rate is desired and well-known V.32 modem technology (9600 baud) is used, only a relatively small shift of one part in thirty-two is necessary. In practice, a somewhat greater shift may be required to allow for overhead and to provide isolation between the two channels. A further refinement, described below, is dynamically to adjust the required shift to the digital data rate as required; thus, much of the time, practically no degradation at all will occur.

This method does require a means of synchronizing the frames of the sending and receiving sides of the communicating telephones. This can be accomplished, among other means, by inserting suitable guard signals between the two channels. By "servoing" on this signal, the receiver can adjust to the amount of shift being used by the sender, as well as correct for whatever time base errors might exist, in well-known fashion. The preferred receiver synchronizing is effected with the aid of the before-mentioned guard bands $GB_1$-$GB_2$, which, thus, serve several functions. $GB_1$ generated at the beginning of each frame, FIG. 1, is designed to allow synchronizing of the frame timing, and also to permit the receiver to make a line noise measurement. Since the frame timing is specified by standard, the receiver, FIG. 7, knows when to expect the $GB_1$ signal within very narrow limits.

Figure 4:
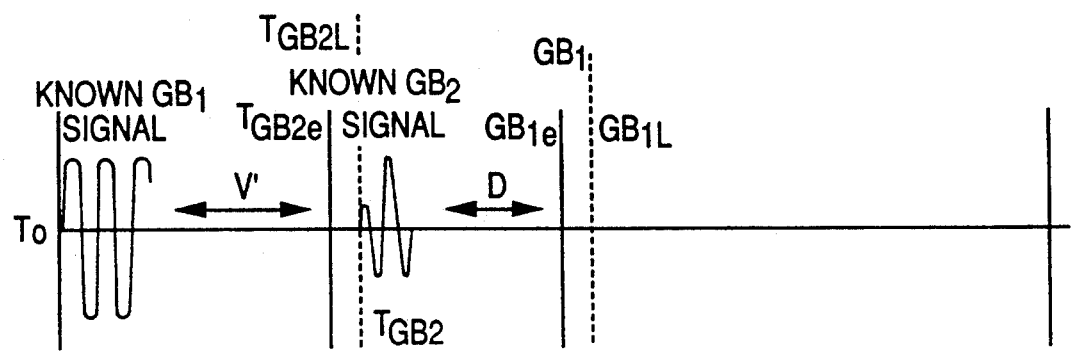
FIG. 4 is a timing diagram of multiplexed signal synchronization.

FIG. 4 presents a detailed view of the multiplexed signal showing such synchronization. Guardband $GB_1$ is a known, specified signal, which serves to mark frame boundaries. Given that $GB_1$ has been identified at To, $GB_2$ must occur somewhere within the interval $T_{GB2e}$ to $T_{GB2L}$ of FIG. 4. This range determines the rate at which the $GB_2$ can be servoed. When $GB_2$ has been identified at $T_{GB2}$, the interval $T_o$-$T_{GB2}$ is used to set the midpoint of the $GB_2$ detection range for the following frame. (Actually, an averaging computation could be used, as is common in servoing systems). The interval during which $GB_1$ may be expected, $GB_{1e}$ to $GB_{1L}$, is much shorter, since the period T is specified by standard. However, it is tracked in a similar fashion to compensate for any tolerance there may be in T as defined by the two ends.

The audio channel interval V' follows the $GB_1$ guardband, and is ended by the generated $GB_2$ guardband, FIG. 2. The timing of $GB_2$ is somewhat more variable since it controls the "split" between the two modes V' and D. In particular, there is a specified maximum "servo-rate", so the interval between $GB_1$ and $GB_2$ is what has occurred recently, plus or minus a delta. Thus, if there is no need to transmit digital data D, the sender will gradually adjust $GB_2$ so that it just precedes the following $GB_1$. This will result in minimum loss of transmission quality. When a digital channel D is desired, the sender shifts $GB_2$ forward in time so as to create room between $GB_2$ and the following $GB_1$ for the digital channel The $GB_2$ signal is designed to allow the receiver to "follow" this shift.

If line conditions are so noisy that the $GB_1$ and $GB_2$ signals cannot be properly identified, the line switches back into the full analog mode through the analog by-pass lines A B-P in FIGS. 2 and 3. This could occur via analog switches or digitally under program control. If line conditions should improve, another telephone recognition signal can be sent by either side to attempt the voice-digital data communication again.

There are a few additional details which require attention. To concatenate successive frames at the receiver without audible clicks, special well-known procedures may be used such as those developed for use by music synthesizers which use the "sampling" technique as described, for example, in Keyboard Magazine, Mar., 1989.

Special refinement procedures may be desirable to deal with various echo suppressors and cancellers which may be present on public switched network phone channels. Turning these off (by procedures well-known and specified by international standards) and using instead an echo model within the terminals is probably useful, as prescribed in the said V.32 standard techniques.

Further modifications will also occur to those skilled in this art and such are considered to fall within the spirit and scope of the invention as defined in the appended claims.

What is claimed is:

1. A method of multiplexing voice-produced audio signals and modem-encoded digital data from telecommunications devices to achieve "data-under-voice" telephone communication while retaining toll-quality voice, comprising converting the audio signals into digital form and then sampling the digitized audio signals at a predetermined rate within a selected time frame of a plurality of equal time frames and storing in buffer means; playing back from the buffer means the sampled digitized audio signals during the next successive time frame in a shorter time than the sampling during the preceding time frame by effectively increasing the rate of sampling per unit time, thereby leaving an unoccupied time interval for the remainder of the frame; and inverting the modem-encoded digital data into the unoccupied time interval created by the increasing of the rate of sampling during the playing back.

2. A method as claimed in claim 1 and in which the played-back sampled digital audio signals are reconverted into analog audio form.

3. A method as claimed in claim 2 and in which the sampling of the digitized audio signals and the playing back are effected in the alternating fashion.

4. A method as claimed in claim 3 and in which an analog signal bypass of the alternating is provided in the event that telephone communication has excessive noise.

5. A method as claimed in claim 1 and in which a pair of guard bands is inserted within each time frame, the first guard bond at the commencement of the time frame before the played-back sampled digitized audio signals and the second guard bond between the played-back sampled digitized audio signals and said inserted modem-encoded digital data.

6. A method as claimed in claim 5 and in which the number of time frames is set in the range of substantially 4 to 10 per second.

7. A method as claimed in claim 6 and in which the sampling of the digitized audio signals is of the order of 8 KHz and the increasing of the rate of sampling is varied to control the unoccupied time interval for the modem-encoded digital data transmission.

8. A method as claimed in claim 5 and in which the second guard band is shifted in time to vary the unoccupied time interval in the time frame for the modem-encoded digital data, as desired.

9. A method as claimed in claim 5 and in which a telephone communication is set up between sending and receiving telephones wherein the receiving telephone receives synchronization with the sending telephone at the time of the first guard band.

10. Apparatus for telephonically over a telephone channel transmitting and receiving between transmitting and receiving telephones voice-produced audio signals and modem-encoded digital data from telecommunications devices while retaining toll-quality telephone voice having, in combination, means for generating a plurality of equal time frames for signal transmission and reception; encoding voice channel means comprising a first pair of alternately filling and emptying buffers connected in multiplexing fashion to an a first analog-to-digital converter receiving analog audio signals and clocked at a predetermined sampling rate; a first digital-to-analog converter clocked at a higher rate and connected to the first pair of buffers for restoring and playing back the analog audio signals at the output; multiplexing controlling means comprising means for sampling the digitally converted audio signals at the predetermined rate during one frame and to play back the sampled digitized audio signals from the first pair of buffers at said higher rate achieving compression during the next frame, leaving an unoccupied time interval for the remainder of said next frame; and means for inserting the modem-encoded digital data into the unoccupied time interval for transmission along the telephone channel with the audio signals.

11. Apparatus as claimed in claim 10 and in which decoding demultiplexing means is provided at the receiving telephone comprising a second pair of alternately filling and emptying buffers for receiving the transmitted audio signals from the telephone channel as fed to a second analog-to-digital converter clocked at the higher rate, and a second digital-to-analog converter clocked at the predetermined rate and connected to one of the second pair of buffers to reproduce the analog audio signals.

12. Apparatus as claimed in claim 11 and in which means is provided for bypassing the multiplexing controlling means and the decoding demultiplexing means to provide for an analog bypass if the telephone channel has excessive noise.

13. Apparatus as claimed in claim 10 and in which means is provided for inserting guard bands in each frame at the commencement of the frame and between the played-back digitally converted audio signals and the inserted modem-encoded digital data.

14. Apparatus as claimed in claim 13 and in which means is provided for synchronizing the time of onset of the time frames at the transmitting and receiving telephones.

15. Apparatus as claimed in claim 14 and in which said synchronizing is controlled by the guard band signals.

16. Apparatus as claimed in claim 10 and in which means is provided for varying the higher rate to vary the unoccupied time interval.

* * * * *